(12) United States Patent
Kroemer et al.

(10) Patent No.: US 8,516,901 B2
(45) Date of Patent: Aug. 27, 2013

(54) RETROFIT ULTRASONIC INSERTION TYPE FLOW METER

(75) Inventors: Harald Kroemer, Ansbach (DE); Wilhelm Öfelein, Ansbach (DE)

(73) Assignee: Hydrometer GmbH, Ansbach (DE)

( * ) Notice: Subject to any disclaimer, the term of this patent is extended or adjusted under 35 U.S.C. 154(b) by 358 days.

(21) Appl. No.: 12/897,332

(22) Filed: Oct. 4, 2010

(65) Prior Publication Data

US 2011/0079090 A1 Apr. 7, 2011

(30) Foreign Application Priority Data

Oct. 2, 2009 (DE) .................... 10 2009 048 011

(51) Int. Cl.
*G01F 1/66* (2006.01)
(52) U.S. Cl.
USPC ...................................... 73/861.25
(58) Field of Classification Search
None
See application file for complete search history.

(56) References Cited

U.S. PATENT DOCUMENTS

| | | | |
|---|---|---|---|
| 6,453,757 B1 | 9/2002 | Montag et al. | |
| 6,508,134 B1* | 1/2003 | Feller | 73/861.27 |
| 6,539,812 B1* | 4/2003 | Bergamini | 73/861.29 |
| 6,591,674 B2* | 7/2003 | Gehman et al. | 73/204.22 |
| 6,681,643 B2* | 1/2004 | Heinonen | 73/861.52 |
| 6,928,865 B2* | 8/2005 | Ito et al. | 73/204.21 |
| 6,973,842 B1* | 12/2005 | Feller | 73/861.27 |
| 7,044,001 B2* | 5/2006 | Sylvia et al. | 73/861.29 |
| 7,287,437 B2* | 10/2007 | Kroemer et al. | 73/861.25 |
| 7,343,795 B2* | 3/2008 | Winter | 73/275 |
| 2011/0277557 A1* | 11/2011 | Kroemer et al. | 73/861.18 |

FOREIGN PATENT DOCUMENTS

| | | |
|---|---|---|
| DE | 32 06 433 | 9/1983 |
| DE | 197 13 526 | 10/1998 |
| EP | 1 227 303 | 7/2002 |
| EP | 2 083 250 | 7/2009 |

* cited by examiner

*Primary Examiner* — Harshad R Patel
(74) *Attorney, Agent, or Firm* — Hamre, Schumann, Mueller & Larson, P.C.

(57) ABSTRACT

The present invention relates to a measurement insert for a flow meter and a flow meter. The present invention discloses using, in a customary housing of a bulk water meter, e.g. a Woltman meter, instead of a device for mechanical flow measurement a measurement insert which comprises an ultrasonic measurement path and can be fastened to the opening of the housing by a housing cover.

10 Claims, 2 Drawing Sheets

RETROFIT ULTRASONIC INSERTION TYPE FLOW METER

POINT OF DEPARTURE

Figure 1:
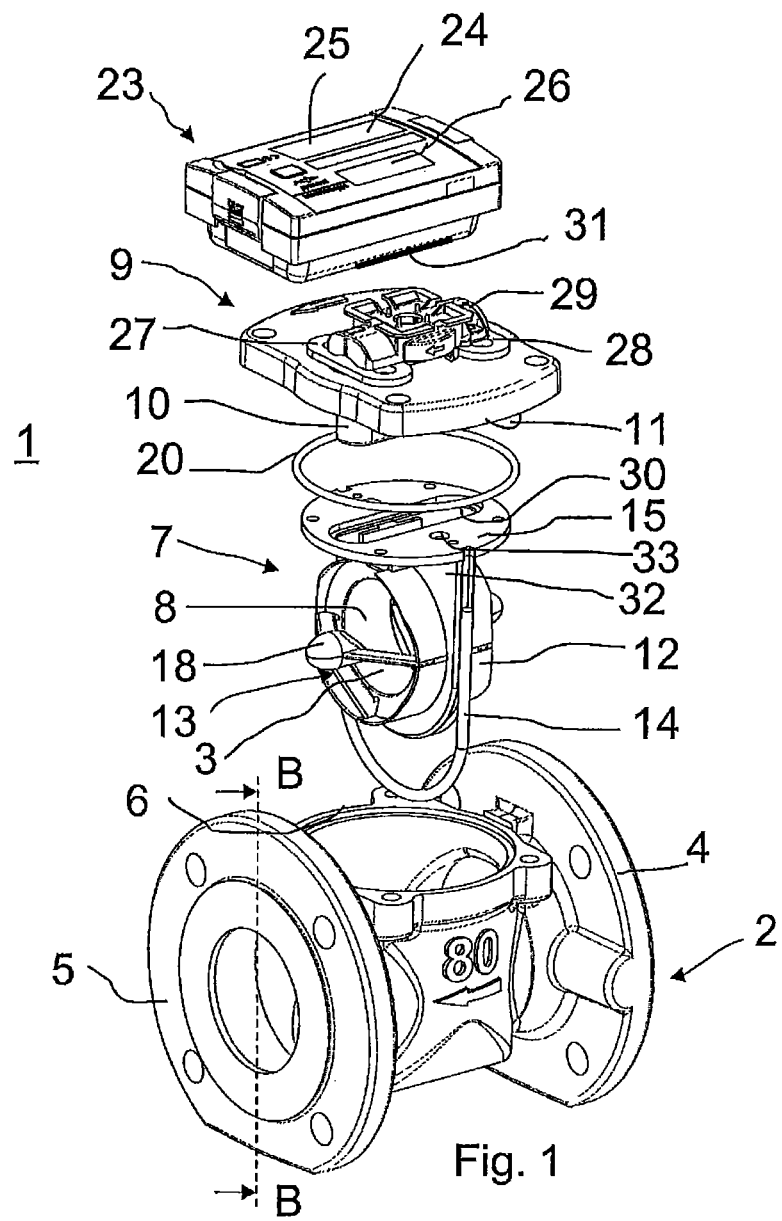

The present invention relates to a measurement insert for a flow meter and a flow meter.

For monitoring the flow of liquid or gaseous media in networks of pipes flow meters are customarily used. The measurement of the flow by means of a particular flow meter is based on different principles of measurement. For example, the flow is monitored with so-called mechanical flow meters in which the rotation of a vane wheel energized by the medium is sampled and fed to an evaluation unit. In addition there are so-called static flow meters which are based on the principle of ultrasonic measurement, usually according to the propagation time difference principle.

Specifically for bulk water meters or so-called volumetric measuring units for high nominal rates of flow, e.g. of 15 $m^3/h$ to 1,500 $m^3/h$, the flow is at the present time predominantly measured by means of mechanical flow meters, also called "Woltman meters." Typical pipe diameters lie in the nominal width ranges of DN 50 to DN 500. Bulk water meters of this type have been in use in great numbers over long periods of time. However, the mechanical components of the bulk water meters are subject to a constant mechanical stress, for example, due to solid parts such as grains of sand or the like, which leads to increased service work. As a consequence of this, bulk water meters must either be operated with an increased amount of service work or replaced by new equipment. Moreover, bulk water meters or volumetric measuring units of this type have the disadvantages of comparatively low precision, a limited range of measurement and a limited service lifetime.

OBJECT

The object of the present invention consists in eliminating the aforesaid disadvantages.

REALIZATION

The object of the present invention is realized by a measurement insert, in particular a measurement insert which can be retrofitted, for a connection fitting of a flow meter for a liquid or gaseous medium, which is characterized by the fact that the flow meter is a bulk water meter, in particular a so-called Woltman meter, the flow meter comprises a housing with a first housing for supplying medium and a second housing for discharging medium both of which can be connected to a network of pipes, the housing comprises an opening which is provided for the insertion of a mechanical vane wheel into the housing, the measurement insert is formed in such a manner that it can be inserted through the aforesaid opening and into the housing, and the measurement insert is provided for this purpose and is formed to accommodate a static measurement path.

The aforedescribed measurement insert makes it possible to retrofit, in a simple manner, bulk water meters or volumetric measuring units which had originally been conceived for mechanical operation and have been in use for a long time, whereby on the one hand only very low costs in comparison to a complete replacement are incurred and on the other hand the pre-existing bulk water meters can be operated in the future with significantly less maintenance work and good long-term stability. In addition there is the capability of data read-out via suitable interfaces (for example, radio, M-Bus, L-Bus, LAN, etc.). In this way the costs of reading the meter will clearly be reduced.

Expediently the static measurement path is an ultrasonic measurement path. Ultrasonic measurement technology has the advantage that in comparison to mechanical meters it provides a significantly lower susceptibility to damage and thus is far more favorable from the standpoint of maintenance than mechanical measurement devices.

Expediently the ultrasonic measurement path is deflected in the measurement insert. It is particularly advantageous if the ultrasonic measurement path is U-shaped. In this case the ultrasonic transducer can be disposed on one side, whereby the connection geometry can be simplified, and therefore the construction of the measurement insert, and the geometry of the housing of the bulk water meter can be exploited.

Expediently the measurement insert comprises a housing cover which is provided for the purpose of fastening the measurement insert to the opening of the housing of the bulk water meter.

Above all, the housing cover expediently also serves as a mounting plate or mounting platform for additional components, for example, for the ultrasonic transducer or transducers. In this way it is possible to create, in a simple manner, an ultrasonic transducer arrangement for ensuring an ultrasonic measurement path which is deflected, in particular deflected in the shape of a U.

According to an advantageous development of the present invention the measurement insert comprises, preferably as an independent part, an insert part which forms a flow duct for the medium. At the same time the insert part accommodates the measurement path completely or at least in part. The insert part thus offers the advantage of providing, for given volume proportions due to the housing of the bulk water meter, a flow cross-section which is defined for the measurement and in which the measurement takes place.

For fastening of the insert part it expediently comprises a fastening plate which makes it possible to connect the insert part to the closure plate to form a manageable unit. Expediently the fastening plate is standardized, that is, it has the same form for different nominal sizes of insert part.

Accordingly the invention makes it possible to keep ready for optional use at least two, preferably a plurality, of insert parts with different flow passages, each of a different cross-sectional surface. In this way different nominal sizes can be covered.

The insert part is expediently sealed with respect to the housing of the connection fitting or the flow meter. In this way it is ensured that the medium flows only through the area of the insert part which comprises the measurement path.

Alternatively the insert part can, however, also be conceived so that only a part of the flow is drawn upon for the measurement.

The deflection of the measurement path is accomplished by means of deflecting reflectors which are carried by holders for the deflecting reflectors.

In an advantageous manner, depending on the construction, the holder for a deflecting reflector can be formed in the insert part. In this way the plurality of parts can be reduced.

Due to the fact that the insert part is composed of two formed parts connected to to one another and the common connecting plane intersects the surface of the deflecting reflector in the installed state, on the one hand the insert part can be formed as a formed part and on the other hand a holding effect for the deflecting reflector to be used can be produced simultaneously, depending on the formed part, by the joining together of the two formed parts.

Furthermore, the closure plate can serve as the base for an additional attachment which, in the joined-together state, has a sandwich-like effect on the closure plate. The attachment makes possible additional functions which were not possible in mechanical meter mechanisms, specifically the reading out of data and/or remote transmission of data and so on.

For this the attachment comprises additional functional units such as perhaps an evaluation unit and/or a display device and/or a data interface and/or a device for remote transmission of data.

For simplified mounting a contacting mechanical plug-in connection can be provided between the attachment and the closure plate. Furthermore means for lead-sealing the plug-in connection can be used.

The present invention furthermore relates to a flow meter, in particular in the form of a bulk water meter, such as, for example, a so-called Woltman meter or a meter comparable to that concept of measurement or a so-called volumetric measuring unit, with a connecting fitting which is at the same time the housing of the flow meter, an opening located in the connection fitting, and a measurement insert for insertion into the opening, said measurement insert according to at least one of the claims.

DESCRIPTION OF A FORM OF EMBODIMENT

An expedient form of embodiment of the present invention will be explained in more detail with the aid of drawings.

Figure 2:
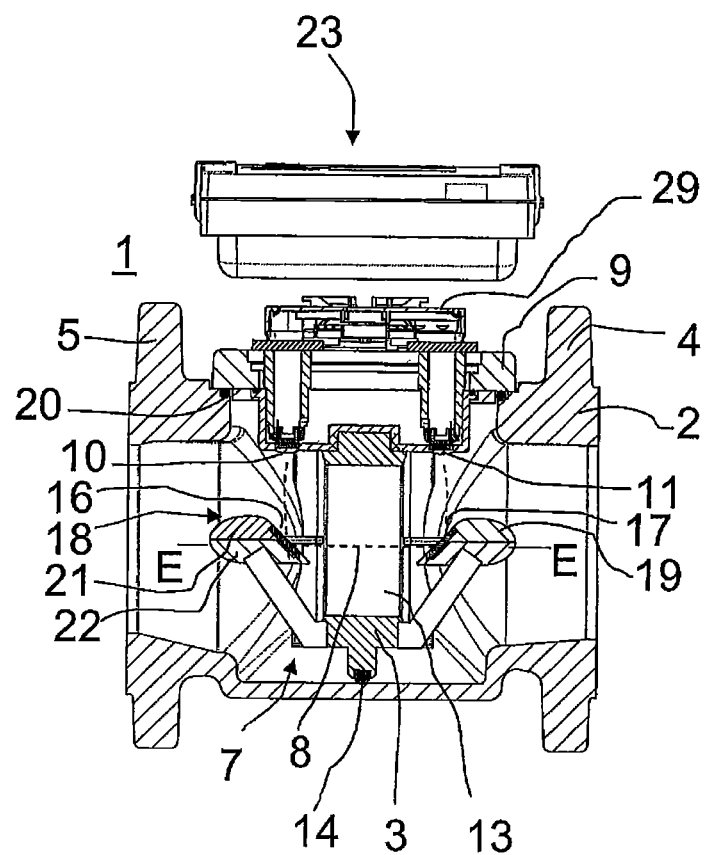

FIG. 1 shows in perspective view an exploded representation of an expedient development of the flow meter according to the invention, FIG. 2 shows a sectional representation along the line B-B in the flow meter of FIG. 1 with the measurement insert installed.

Reference number 1 in FIG. 1 denotes the flow meter in its entirety. This is typically the housing 2 of a so-called "Woltman meter," that is, a bulk water meter like those which have been used for many years for typical pipe diameters in the nominal width ranges specified in DN 50 to DN 500. This type of bulk water meter permits nominal flow rates in the range of 15 m$^3$/h to 1,500 m$^3$/h. These bulk water meters customarily have a design which comprises a vane wheel by means of which the flow rate can be inferred from the rotation of the vane wheel.

The housing 2, which typically consists of metal, is installed in a (not represented) network of pipes. For its connection the housing 2 comprises a first connection 4 for supplying medium, e.g. water, into the flow meter 1 as well as a second connection 5 for discharging said medium from said flow meter.

In the area of the housing 2 a (not represented) housing opening can be provided which can be used to specify an additional variable, such as, for example, the temperature, through the use of a temperature sensor or the like. This housing opening can also be used to connect an additional flow meter (not represented in the figure), expediently a flow meter based on the principle of ultrasonic measurement, with which a bypass line is monitored and both flow meters form a so-called "composite water meter."

Furthermore, in the housing 2 there is, in a plane parallel to the path of the medium, a large-surface opening 6 which, in customary bulk water meters, aids in inserting the parts required for the mechanical flow measurement.

According to the invention a measurement insert 7 for ultrasonic measurement is provided in the bulk water meter.

The measurement insert 7 comprises an insert part 12 with an annular body 3 which on its upper side is connected to a fastening plate 15. Towards the fastening plate 15 the annular body 3 transitions into a linear area 32. Sealing means 14 are provided on the outer circumference in the form of a seal laid into a groove. The sealing means 14 serve to seal the measurement insert 7 with respect to the inner side of the housing 2 so that the entire flow of medium runs through the flow opening 13 of the measurement insert 7.

On the upper side of the fastening plate 15 there is an elongate passage hole 30 as well as additional fastening openings 33. The form and/or size of the fastening plate 15 is chosen so that it can be inserted into the opening 6 on the upper side of the housing 2, preferably fitting precisely. The form of the passage hole 30 can be chosen freely, for example, instead of this it is also possible to provide individual, round openings.

The measurement insert 7 comprises two holders 18, 19 for deflecting reflectors, each of the holders carrying a deflecting reflector (cf. also FIG. 2). In FIG. 1 it is only possible to see one deflecting reflector holder 18, which carries the deflecting reflector 16. The deflecting reflectors serve to ensure a deflection of the ultrasonic signal, in the present case a U-shaped deflection.

In the area of the measurement path 8 a flow duct 13 with precisely set flow cross-section is defined by the annular body 3.

A housing cover 9 serves to fasten the measurement insert 7. The housing cover 9 carries two holder inserts 27, 28 for ultrasonic transducers 10, 11. The holder inserts 27, 28 for the corresponding ultrasonic transducers extend downwards from the housing cover 9 as seen in FIG. 1. In the installed state they run through the elongate passage hole 30 in the fastening plate 15 of the measurement insert 7.

For installation the measurement insert 7 and the housing cover 9 are pre-mounted to form a manageable unit, inserted into the opening 6, and fastened to the housing by means of the housing cover 9. Between the housing cover 9 and the housing 2 there is a suitable sealing means 20, for example, in the sealing ring. The installation of the housing cover 9 on the housing 2 is accomplished via screws (not represented), which reach through corresponding openings on the housing cover 9 and engage in the corresponding openings on the housing 2.

On the upper side of the housing cover 9 there is a transducer cover 29 which also serves as a holder for the attachment 23, which serves for evaluation, recording data, transmitting data, and/or, in given cases, for display. In this case a mechanical plug-in connection is preferably provided. The attachment 23 can expediently comprise a display unit 26 and/or a data interface 25, for example, an optical interface such as, for example, an infrared interface. Furthermore, an evaluation unit 24, e.g. a computer unit and/or processor unit and/or a device for data transmission (for example, a radio module) can be provided in the attachment 23. For signal transmission from the respective transducer to the attachment 23 a cable connection (not represented) is provided.

FIG. 2 furthermore shows an example of a possible design of the measurement insert 7 in a sectional plane along the flow perpendicular to the plane of the housing cover 9 (sectional plane B-B in FIG. 1). As can be seen from FIG. 2, the respective holder 18 or 19 for a deflecting reflector can be made of two formed parts, specifically a first formed part 21 and a second formed part 22, which are in contact with one another along a connecting plane E. In addition to this the annular body 3 can consist of two parts disposed in the longitudinal direction relative to one another. The plane E of the connection runs through, for example, the two holders 18, 19 for the deflecting reflectors and intersects the plane of the deflecting reflectors 16, 17.

Furthermore it becomes clear from FIG. 2 how the flow duct 13, in which the deflecting reflectors 16, 17 are located, is defined by the annular body 3.

As can also be seen from FIG. 2 the two holders 18, 19 for the deflecting reflectors are given a streamlined shape in order to cause as little turbulence as possible and to provide a cleaning effect on the reflector surface.

In FIG. 2 the course of the measurement path 8 can be seen. The ultrasonic signal runs starting from the transducer 10 in the direction of the first deflecting reflector 16, from there is deflected by 90° to the second deflecting reflector 17, and from there is once again deflected by 90° upwards to the second ultrasonic transducer 11 and back. The measurement insert 7 is preferably provided as a plastic part, for example, an injection-molded part. For this purpose the formed parts 21, 22 in question are produced in the corresponding forming processes and are subsequently connected to one another using a suitable connection technology, such as, for example, ultrasonic welding or ultrasonic gluing.

The insert 7 is, as has already been described in the introduction, sealed with respect to the housing 2 by means of sealing means 14. Moreover, sealing means 20 are also provided between. the mounting plate 9 and the housing 2.

The attachment 23 has on its lower side a recess 31 which, together with the transducer cover 29 on the upper side of the housing cover 9, ensures a contact geometry for a mechanical plug-in connection which can be carried out in a simple manner.

For installation on the transducer cover 29 of the housing cover 9 the attachment 23 is mounted laterally and subsequently pushed in the horizontal direction and, in given cases, latched in place.

The present invention allows measurement inserts 7 with different flow ducts 13 formed according to requirements to be used in customary housings of Woltman meters. The retrofitting of this type of housing with ultrasonic measurement inserts of the type described ensures on the one hand a significantly lower investment in comparison to a complete replacement of the devices and on the other hand the provision of flow meters with significantly more favorable service and repair cycles. In addition the dynamics and precision of measurement can be increased.

The disclosure of this application also covers partial combinations of the features which are apparent from the figures to the extent that the principle according to the invention is maintained thereby.

LIST OF REFERENCE NUMBERS

1 Flow meter
2 Housing
3 Annular body
4 First connection
5 Second connection
6 Opening
7 Measurement insert
8 Ultrasonic measurement path
9 Housing cover
10 Ultrasonic transducer
11 Ultrasonic transducer
12 Insert part
13 Flow duct
14 Sealing means
15 Fastening plate
16 Deflecting reflector
17 Deflecting reflector
18 Holder for a deflecting reflector
19 Holder for a deflecting reflector
20 Sealing means
21 First formed part
22 Second formed part
23 Attachment
24 Evaluation unit
25 Interface
26 Display unit
27 Holding insert
28 Holding insert
29 Transducer cover
30 Passage hole
31 Recess
32 Linear area
33 Fastening opening

The invention claimed is:

1. A retrofit flow measurement assembly for a housing of a Woltman meter, the retrofit flow measurement assembly comprising:
a housing cover for the housing, the housing cover comprising an ultrasonic transducer; and
a measurement insert configured to be insertable into the housing via an opening of the housing, the opening being open perpendicularly to direction of fluid flow from a first connection of the housing to a second connection of the housing, the first connection and the second connection are for connecting to a network of pipes,
wherein the measurement insert comprises a fastening plate configured to fit the opening, the fastening plate connected to an insert part,
wherein the insert part comprises a first deflector disposed to be below the ultrasonic transducer, and a second deflector disposed in a downstream direction of the fluid flow from the first deflector, wherein the first deflector is configured to deflect an ultrasonic signal transmitted from the ultrasonic transducer towards the second deflector, the second deflector is configured to deflect the ultrasonic signal deflected from the first deflector, such that a path of the ultrasonic signal transmitted from the ultrasonic transducer, deflected by the first deflector, and deflected by the second deflector has a U-shape, and
wherein the fastening plate includes a passage hole for the ultrasonic signal to travel therethrough.

2. The retrofit measurement assembly according to claim 1, further comprising:
a holder having a streamlined shape disposed upstream from the first deflector.

3. The retrofit measurement assembly according to claim 2, further comprising:
a second holder having a streamlined shape disposed downstream from the second deflector.

4. The retrofit measurement assembly according to claim 1, further comprising:
a sealing ring disposed between the fastening plate and the housing cover.

5. The retrofit measurement assembly according to claim 1, wherein
the housing cover further comprises a second ultrasonic transducer disposed to be above to the second deflector,
wherein the second deflector is configured to deflect the ultrasonic signal deflected from the first deflector towards the second ultrasonic transducer, and
the second deflector is configured to deflect a second ultrasonic signal transmitted from the second ultrasonic transducer towards the first deflector, and the first deflector is further configured to deflect the second ultrasonic signal from the second deflector towards the first ultrasonic transducer, such that a path of the second ultrasonic signal transmitted from the second ultrasonic transducer to the first ultrasonic transducer via the second deflector and the first deflector has a U-shape.

6. A flow meter, comprising:
a housing which comprises a first connection to a network of pipes for supplying medium from the network of pipes into the housing, a second connection to the network of pipes for removing medium from the housing to the network of pipes, and an opening is open perpendicularly to direction of fluid flow from the first connection to the second connection;
a housing cover covering the opening, the housing cover comprising an ultrasonic transducer; and
a measurement insert inserted into the housing via the opening, the measurement insert comprising a fastening plate which fits the opening, the fastening plate connected to an insert part,
wherein the insert part comprises a first deflector disposed below the ultrasonic transducer, and a second deflector disposed in a downstream direction from the first deflector, wherein the first deflector is configured to deflect an ultrasonic signal transmitted from the ultrasonic transducer towards the second deflector, the second deflector is configured to deflect the ultrasonic signal deflected from the first deflector, such that a path of the ultrasonic signal transmitted from the ultrasonic transducer, deflected by the first deflector, and deflected by the second deflector has a U-shape, and
wherein the fastening plate includes a passage hole for the ultrasonic signal to travel therethrough.

7. The flow meter according to claim 6, wherein the measurement insert further comprises a holder having a streamlined shape disposed upstream from the first deflector.

8. The flow meter according to claim 7, wherein the measurement insert further comprises a second holder having a streamlined shape disposed downstream from the second deflector.

9. The flow meter according to claim 6, further comprising:
a sealing ring disposed between the fastening plate and the housing cover.

10. The flow meter according to claim 6, wherein the housing cover further comprises a second ultrasonic transducer disposed above to the second deflector,
wherein the second deflector is configured to deflect the ultrasonic signal deflected from the first deflector towards the second ultrasonic transducer, and
the second deflector is configured to deflect a second ultrasonic signal transmitted from the second ultrasonic transducer towards the first deflector, and the first deflector is further configured to deflect the second ultrasonic signal from the second deflector towards the first ultrasonic transducer, such that a path of the second ultrasonic signal transmitted from the second ultrasonic transducer to the first ultrasonic transducer via the second deflector and the first deflector has a U-shape.

* * * * *